(No Model.) 2 Sheets—Sheet 2.
J. JACKSON.
RUNNING GEAR FOR VEHICLES.
No. 377,260. Patented Jan. 31, 1888.
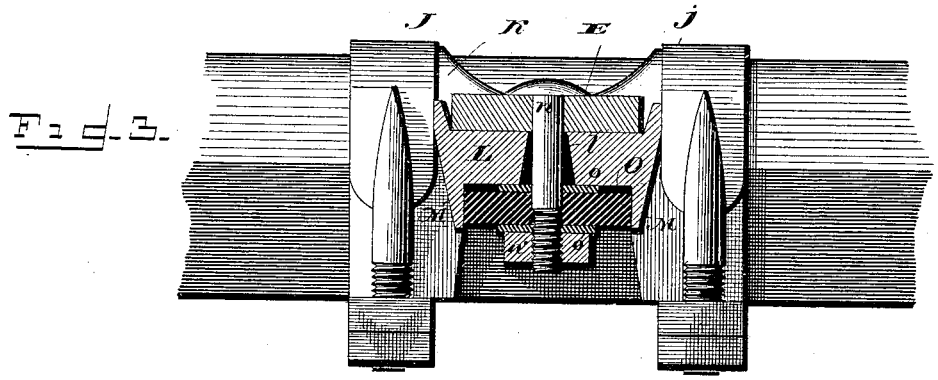
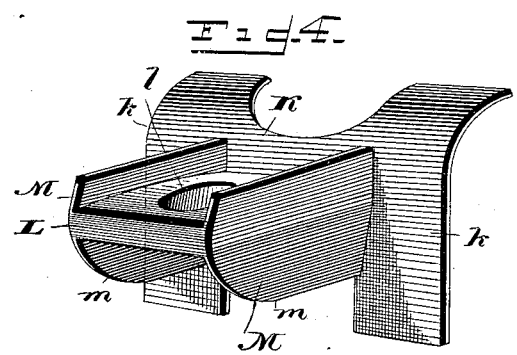
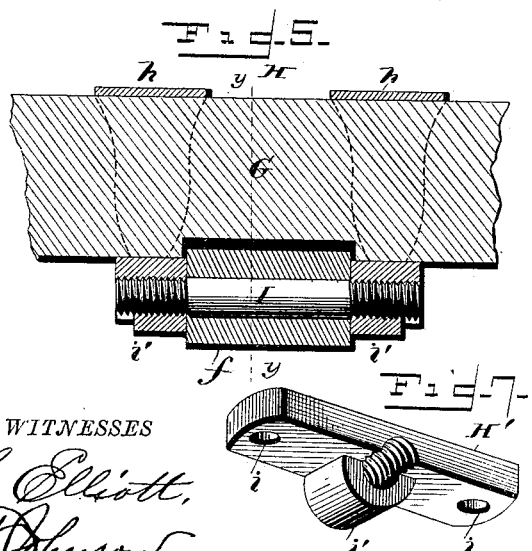
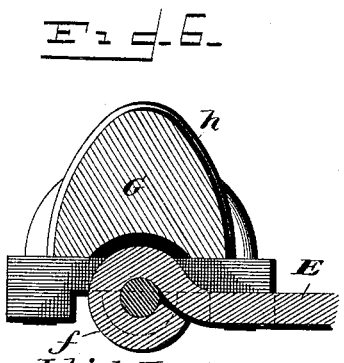
WITNESSES
G. S. Elliott
E. W. Johnson
Johiel Jackson
INVENTOR
Attorney
N. PETERS. Photo-Lithographer, Washington, D. C.

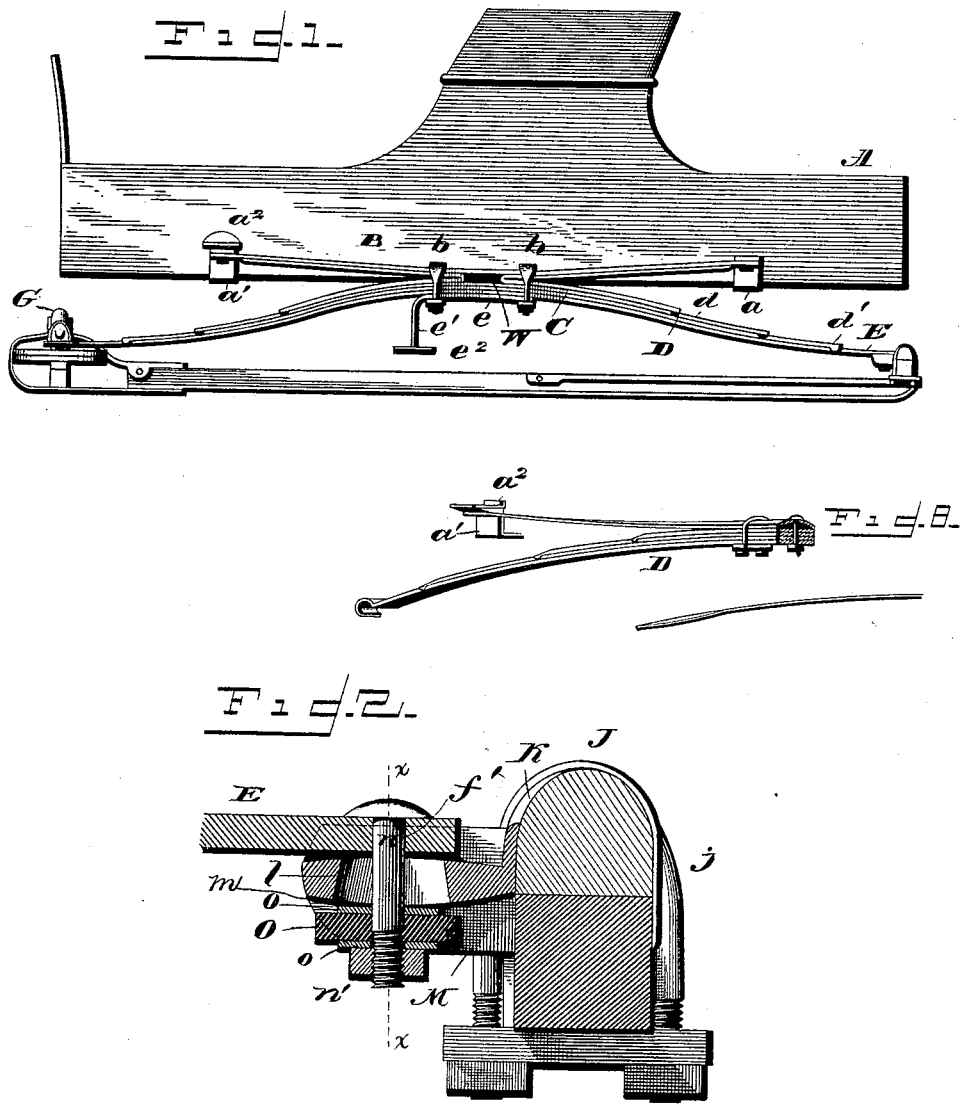

United States Patent Office.

JOHIEL JACKSON, OF FORT ATKINSON, WISCONSIN.

RUNNING-GEAR FOR VEHICLES.

SPECIFICATION forming part of Letters Patent No. 377,260, dated January 31, 1888.

Application filed September 9, 1887. Serial No. 249,261. (No model.)

*To all whom it may concern:*

Be it known that I, JOHIEL JACKSON, a citizen of the United States of America, residing at Fort Atkinson, in the county of Jefferson and State of Wisconsin, have invented certain new and useful Improvements in Running-Gear for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs and running-gear for vehicles, the object of my invention being to provide an improved construction of side springs and a novel, cheap, and effective means for attaching the side springs to the cross-bars of the vehicle, which are attached above the fifth-wheel; also, to provide improved means for securing the rear end of the spring to the hind axle.

My invention has also for its object to provide an improved form of front and rear shackles, whereby the spring may move upon the same.

With the above ends in view my invention consists in the construction and combination of the parts, as will be hereinafter fully set forth, and specifically pointed out in the claims.

In the accompanying drawings, which illustrate my invention, Figure 1 is a side view of a vehicle showing my improved side spring and shackles applied thereto. Fig. 2 is an enlarged sectional view taken vertically through the center of the rear shackle. Fig. 3 is a vertical sectional view through the line $x\ x$ of Fig. 2. Fig. 4 is a detail perspective view of one of the parts of my improved shackle which I use upon the rear axle of the vehicle. Fig. 5 is a longitudinal sectional view through the front cross-bar showing in part the construction of the shackle employed for attaching the front end of the side spring thereto. Fig. 6 is a sectional view taken through the line $y\ y$ of Fig. 5. Fig. 7 is a detail perspective view of the plate through which the ends of the shackles attached to the front cross-bar pass, and Fig. 8 is a detail perspective view of a modification of the side spring.

In the accompanying drawings, A refers to the body of the vehicle, which may be of ordinary construction, the same being provided on its under side with transverse or cross straps $a$ and $a'$, which are bolted to the under side of the body of the vehicle, and these metallic straps may extend wholly or in part under the side of the body, as may be desired. The ends of the straps $a$ and $a'$ project slightly upward over the sides of the vehicle, and again outwardly, these outwardly horizontal ends being rigidly attached to the ends of the upper leaf of the side spring by means of suitable bolts, which pass through suitable perforations formed in the ends of the spring and in the outwardly-projecting ends of the straps $a$ and $a'$. The same bolt which secures the strap $a'$ to the front end of the upper leaf of the spring is also employed for holding in place a step, $a^2$, which may be of ordinary construction.

The side spring consists of what I term an "upper" and "lower" portion, said portions being securely united to each other. The upper portion consists of a plate or leaf, B, which extends from the straps $a$ and $a'$, to which the ends are secured, and beneath said leaf is placed leaves C C, which are bent upon themselves so as to provide diverging members. The upper portion of the spring-leaves C lie immediately beneath the leaf B, while the lower member is curved or bent so as to conform with the configuration of the upper leaf, $d$, of the semi-elliptical spring D. The lower ends of the diverging springs C have their ends flattened, and are provided with downwardly-projecting nibs, which lie over the sides of the leaf of the semi-elliptical spring D, immediately beneath the same, and each of the leaves $d$ and $d'$ have also these downwardly-projecting portions formed thereon, which lie over the sides of the next adjacent leaf beneath. These downwardly-projecting portions on the ends of the spring prevent the leaves, which should lie one above the other, from becoming displaced.

In placing the side spring together the acutely-bent ends of the diverging springs C C do not come together, but only lie a short distance within the clips $b\ b$, which are employed for securing the leaves to each other, and the space between these acutely-bent ends of the members C C of the spring may be filled with a block, W, of rubber or other elastic material, which may be held within this space either by the compression of the material or a suitable bolt, and when such a bolt is employed a perforation is provided through each of the plates constituting the spring. Instead of providing a block which will fill the entire space, I may employ merely a rubber washer, which will be held in place by the bolt.

By providing a space and the rubber block W between the acutely-bent ends of the members C of the spring I can give to the center of the spring a spring movement which could not be obtained if all the plates came together. I may also employ within the vacant space between the diverging springs C C a rubber or metallic collar.

The spring constructed as hereinbefore described will not only have a spring movement at its ends, but will also have a spring movement at its center portion between the clips $b$ $b$, for when the ends of the semi-elliptical spring D are bent upwardly and the ends of the upper portion of the side spring are bent downwardly the plates between the clips $b$ $b$ will be moved in opposite directions or separated, so as to impart greater elasticity to the spring. Under the lower leaf, E, of the semi-elliptical spring D is placed the leaf or plate $e$, which is bent downwardly at its front end, as shown at $e'$, which downwardly-projecting end may be bent outwardly, so as to form a step, $e^2$.

The front end of the leaf E, which forms a portion of the semi-elliptical spring D, is bent into an eye, as shown at $f$, while the rear end is provided with a vertical portion, $f'$, through which passes an ordinary bolt, $n$, which is employed to attach the same to the shackle on the rear axle, the front end of the leaf E being secured to the shackle of the front cross-bar by a horizontal bolt.

The front cross-bar, G, near the outer ends thereof, has attached thereto shackles H, as shown in Figs. 5 and 6, these shackles consisting of clips $h$ $h$, which extend partially around the cross-bar G, the lower ends thereof being screw-threaded and provided with nuts. The screw-threaded ends of the shackles $h$ $h$ pass through perforations $i$ $i$ in plates H, which are placed immediately under the cross-bar G.

I refers to a bar, both ends of which are screw-threaded, and after this bar is passed through the eye $f$ in the front end of the plate E of the spring the plates H', which have centrally-enlarged and screw-threaded portions $i$, are secured to the ends of the bar I. The threaded ends of the clips $h$ $h$ are then passed through the perforations $i$, and the nuts are made fast.

The under side of the cross-bar G is recessed, so that the eye $f$ in the end of the spring-plate or leaf E can move freely on the bar I. By this special form of construction I provide a convenient means for attaching the front ends of the springs D, so that they will be movable or can turn upon the cross-bar $i$, and, the shackles being constructed as described and shown, permit the clips $h$ to be securely connected to each other, so that they cannot spread the bar I, not only serving as a bearing for the spring, but also connect the plates H' to each other.

The rear shackles, J, which are employed for connecting the rear ends of the lower leaf, E, of the semi-eliptical spring D to the hind axle, are attached to said hind axle by clips $j$, which are of ordinary construction, these clips lying over the projecting portions $k$ $k$ of the shackle, which is placed next to the front side of the hind axle before being rigidly secured thereto. To the plate K is attached a forwardly-projecting portion, L, which is provided centrally with a slot, $l$. This forwardly-projecting portion L is also provided at its sides with vertical portions $m$ $m$, which extend above and below the portion L. The upper portion of the forwardly-projecting portion L is curved slightly downward, while the under side is curved from end to end, as shown at $m$, Fig. 2. The rear end of the member E of the spring D is connected to the shackle by a bolt, $n$, the head of which rests upon the upper portion of the spring, while said bolt extends through the slot $l$, and is provided at its lower end with a nut, $n'$. Upon the bolt, beneath the curved portion $m$ of the projecting portion L, are placed washers $o$ $o$ and a rubber block, O, so as to give to the bolt a slight play.

By providing a shackle of the construction hereinbefore described the rear ends of the spring are permitted to have a rocking motion upon the shackle as well as a longitudinal movement in the slot, both of which movements assist in making an easy-riding vehicle.

By means of the devices hereinbefore described I am enabled to place the front ends of the spring quite low down, and the rear shackle, having a sliding movement, will take up the length of the spring when the same is depressed by the load in the vehicle, and it is not necessary to have one end of the semi-elliptical spring longer than the other or of greater thickness in the leaves.

If it is desired to give more than the usual degree of rigidity to the hind portion of the spring, as is sometimes required in different classes of vehicles, I can accomplish this end by making the rear acutely-bent spring C of greater thickness and weight than the corresponding front member. This stiffness of spring may also be accomplished by making the leaves of the spring slightly convex in cross-section, as shown in Fig. 8 of the accompanying drawings, which will add stiffness to the same without additional weight.

I claim—

1. The combination, with the running-gear of a vehicle, a side spring consisting of a semi-elliptical extended lower plate secured at its ends to the running-gear, to which is clipped, adjacent to the center thereof, independent spring-plates, which are centrally bent so that the ends will diverge and be parallel with the lower portion of the side spring, the top spring-plate C being bent upon itself, with the top arm thereof longer than the lower arm and normally in a position away from the said lower arm, the extended arm B, against the under side of which the extended arms of the upper bent spring C engage, the said springs all being united by clips which are passed over the springs to one side of the bend of the upper bent spring C and the attaching angular bends $a^2$ of the cross-bars $a$, which are secured to the body of the vehicle, substantially as described.

2. In combination with a side spring constructed, substantially as shown, so as to provide a central space between the spring-sections, an elastic block, W, secured within said space, substantially as and for the purpose set forth.

3. In combination with a semi-elliptical spring, spring-plates C C, having the members thereof bent so as to provide diverging plates or leaves, and an upper plate to which the body of the vehicle is attached, the parts being clipped to each other and organized so as to provide a central space within which is secured an elastic block, substantially as shown, and for the purpose set forth.

4. In combination with the side springs having a front end formed into eyes, shackles for connecting the same to the front cross-bar, consisting of clips $h\ h$, plates H', with end perforations, $i$, and centrally-enlarged and screw-threaded portions $i'$ and bar I, having the ends screw-threaded so as to form a connecting means for the end spring, and portions H', substantially as shown, and for the purpose set forth.

5. In combination with a spring, the rear end of which is provided with a vertical perforation, a shackle having a plate adapted to lie adjacent to the front side of the hind axle, to which it is secured by clips, said plate having a forwardly-projecting portion, L, which is curved on its upper and lower edges, vertical side plates, M, and a central slot, $l$, through which the connecting-bolt passes, and washers with a spring-cushion interposed between the same and a fastening-nut, substantially as shown, and for the purpose set forth.

6. The combination, with a running-gear for vehicles, constructed substantially as shown, of a side spring having the end portion of the leaves constituting said spring convex in cross-section, and a spring which is concave in cross-section clipped to the same and attached at its ends to the supporting-strips of the vehicle-body, substantially as shown, and for the purpose set forth.

In testimony whereof I affix my signature in presence of two witnesses.

JOHIEL JACKSON.

Witnesses:
 JAS. S. JACKSON,
 GEO. C. SMITH.